(12) United States Patent
Harrison

(10) Patent No.: US 12,320,371 B2
(45) Date of Patent: Jun. 3, 2025

(54) CONTROL STRATEGY FOR HYDRAULIC SYSTEM

(71) Applicant: Goodrich Actuation Systems Limited, Solihull (GB)

(72) Inventor: Colin Roger Harrison, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/749,237

(22) Filed: May 20, 2022

(65) Prior Publication Data
US 2022/0397134 A1 Dec. 15, 2022

(30) Foreign Application Priority Data
Jun. 9, 2021 (EP) ..................................... 21178618

(51) Int. Cl.
*F15B 19/00* (2006.01)
*B64C 13/40* (2006.01)
(Continued)

(52) U.S. Cl.
CPC .............. *F15B 19/00* (2013.01); *B64C 13/40* (2013.01); *F15B 19/005* (2013.01);
(Continued)

(58) Field of Classification Search
CPC ........ B64C 13/40; F15B 19/00; F15B 19/005; F15B 20/004; F15B 20/005;
(Continued)

(56) References Cited

U.S. PATENT DOCUMENTS 4,257,311 A 3/1981 Barnsley et al.
7,191,593 B1 * 3/2007 Ho .......................... B64C 13/504
60/473
(Continued)

FOREIGN PATENT DOCUMENTS

DE 102005042511 A1 4/2007
WO 2006056214 A1 6/2006
(Continued)

OTHER PUBLICATIONS

Abstract for DE102005042511 (A1), published on Apr. 5, 2007, 1 page.
(Continued)

*Primary Examiner* — Matthew Wiblin
(74) *Attorney, Agent, or Firm* — CANTOR COLBURN LLP

(57) ABSTRACT

A system for controlling a hydraulic component. The system includes a control system configured to carry out a health check routine having steps of (A) fluidly connecting one of the hydraulic supply systems with the component until (i) a predetermined pressure is reached on the hydraulic supply side and/or the hydraulic return side, and/or (ii) a predetermined amount of time has passed; then (B) isolating the pressurised hydraulic fluid within the hydraulic supply side and the hydraulic return side so that hydraulic fluid leaks from the hydraulic supply side to the hydraulic return side via the controlled leakage; (C) monitoring the pressure of hydraulic fluid within the hydraulic supply side (50S) and/or the hydraulic return side over time; and then (D) determining if the pressure of hydraulic fluid within the hydraulic supply side and/or the hydraulic return side follows a predetermined or expected pattern.

23 Claims, 1 Drawing Sheet

(51) Int. Cl.
  *F15B 20/00* (2006.01)
  *G01M 3/26* (2006.01)
(52) U.S. Cl.
  CPC .......... *F15B 20/004* (2013.01); *F15B 20/005* (2013.01); *G01M 3/26* (2013.01); *F15B 2211/8633* (2013.01); *F15B 2211/8636* (2013.01); *F15B 2211/864* (2013.01)
(58) Field of Classification Search
  CPC ...... F15B 2211/8633; F15B 2211/8636; F15B 2211/864; G01M 3/26
  See application file for complete search history.

(56) References Cited

U.S. PATENT DOCUMENTS

| | | |
|---|---|---|
| 8,418,955 B2 | 4/2013 | Recksiek et al. |
| 10,507,814 B2 | 12/2019 | Zell et al. |
| 10,947,997 B2 | 3/2021 | Fox et al. |
| 2013/0276516 A1 | 10/2013 | Tabor |
| 2018/0120193 A1* | 5/2018 | Mell ..................... F16K 31/122 |
| 2019/0257328 A1* | 8/2019 | Erikksson .............. B62D 5/003 |
| 2020/0355605 A1* | 11/2020 | Causey, III ............ A61B 5/157 |
| 2021/0063271 A1* | 3/2021 | Mazrooee ........... G01M 3/2892 |
| 2021/0164858 A1* | 6/2021 | Armentrout .......... G01M 15/04 |

FOREIGN PATENT DOCUMENTS

| | | |
|---|---|---|
| WO | 2016172115 A1 | 10/2016 |
| WO | 2020139949 A1 | 7/2020 |

OTHER PUBLICATIONS

European Search Report for Application No. 21178618.1, mailed Dec. 12, 2021, 10 pages.

* cited by examiner

CONTROL STRATEGY FOR HYDRAULIC SYSTEM

CROSS-REFERENCE TO RELATED APPLICATIONS

This application claims priority to European Patent Application No. 21178618.1 filed Jun. 9, 2021, the entire contents of which is incorporated herein by reference.

FIELD OF THE INVENTION

The present invention relates to a system for controlling a hydraulic component, wherein the system is configured to connect multiple hydraulic supply systems (i.e., from different sources of hydraulic fluid) to the component. The present invention could be used in any suitable application where multiple hydraulic supply systems are used, and would be particularly applicable to applications where backup hydraulic supplies are used (e.g., aircraft).

BACKGROUND

Hydraulic supply systems may be used to supply hydraulic fluid to control or actuate a component. In the context of an aircraft, flight control surfaces (for example) may be controlled in this manner. In such situations it may be desirable to provide multiple hydraulic supply systems to the component. This ensures that there is a backup supply if a first hydraulic supply is unavailable, for example due to leakage or a failure in the hydraulic supply system. Ideally, both hydraulic supplies should remain largely independent, such that a failure of the component, for example a leakage, is not passed between the supplies.

It is desired to provide an improved system and method for carrying out a health check on a system comprising a hydraulically actuated component, which can (for example) mitigate risks when switching on a hydraulic supply system, and/or switching from one hydraulic supply system to another.

SUMMARY

According to an aspect of the present invention, there is a system for controlling a hydraulic component. The system comprises a hydraulic component, a plurality of hydraulic supply systems, a device and a control system. The hydraulic component comprises a hydraulic supply side, a hydraulic return side, and a controlled leakage between the hydraulic supply side and the hydraulic return side. The plurality of hydraulic supply systems are each configured to selectively supply pressurised hydraulic fluid to the component. The control system is configured to carry out a health check routine on one or more of the hydraulic supply systems. The health check routine comprises: (A) fluidly connecting one of the hydraulic supply systems with the component until (i) a predetermined pressure is reached on the hydraulic supply side and/or (ii) a predetermined amount of time has passed; then (B) isolating the pressurised hydraulic fluid within the hydraulic supply side and the hydraulic return side so that hydraulic fluid leaks from the hydraulic supply side to the hydraulic return side via the controlled leakage; (C) monitoring the pressure of hydraulic fluid within the hydraulic supply side and/or the hydraulic return side over time; and then (D) determining if the pressure of hydraulic fluid within the hydraulic supply side and/or the hydraulic return side follows a predetermined or expected pattern.

According to another aspect of the present invention, there is a method of operating a hydraulic component, wherein the hydraulic component comprises a hydraulic supply side and a hydraulic return side and a controlled leakage is provided between the hydraulic supply side and the hydraulic return side, the method comprising: providing a plurality of hydraulic supply systems, each configured to selectively supply pressurised hydraulic fluid to the component, and the steps of: (A) fluidly connecting one of the hydraulic supply systems with the component until (i) a predetermined pressure is reached on the hydraulic supply side and/or (ii) a predetermined amount of time has passed; then (B) isolating the pressurised hydraulic fluid within the hydraulic supply side and the hydraulic return side so that hydraulic fluid leaks from the hydraulic supply side to the hydraulic return side via the controlled leakage; (C) monitoring the pressure of hydraulic fluid within the hydraulic supply side and/or the hydraulic return side over time; and then (D) determining if the pressure of hydraulic fluid within the hydraulic supply side and/or the hydraulic return side follows a predetermined or expected pattern.

The following optional features may be applied to either of the above aspects, which refer to the present invention as a system and subsequently a method (wherein the system and method may be claimed independently of each other).

Controlled leakage is a term used in relation to hydraulically actuated components that the skilled person would understand. The controlled leakage between the supply and return sides of a component could comprise natural leakage (e.g., through a motor), and/or comprise a device (e.g., bleed or flow restrictor/constriction) that could be included in the component. However it is provided, the isolating referred to above may comprise forming a closed hydraulic system comprising the hydraulic supply side and the hydraulic return side, such that the pressure of hydraulic fluid equalises over time between the supply and return sides by virtue of the controlled leakage.

The isolating may comprise fluidly disconnecting the hydraulic supply system referred to in step (A) from the component.

Each of the hydraulic supply systems may be configured to selectively fluidly connect a hydraulic supply line to the hydraulic supply side and a hydraulic return line to the hydraulic return side.

The control system may be configured to control which of the hydraulic supply systems are fluidly connected to the component, for example using one or more valves.

The predetermined or expected patterns may correspond to a predetermined or expected pressure equalisation between the supply and return lines, as would be measured by monitoring the pressure of hydraulic fluid within the hydraulic supply side and/or the hydraulic return side.

The control system may be configured to perform the health check routine when the system is in an active state and a first of the hydraulic supply systems is supplying hydraulic fluid to the component, wherein prior to step (A) a hydraulic fault is detected and the control system fluidly disconnects the first of the hydraulic supply systems from the component, and the hydraulic supply system referred to in step (A) is a second, backup hydraulic supply system.

The control system may be configured to perform the health check routine when the system is in an inactive state and none of the hydraulic supply systems are supplying hydraulic fluid to the component.

The health check routine may be carried out repeatedly over time (e.g., periodically).

Step (D) may comprise comparing the monitored pressure over time from step (C) with a pressure-time curve, and one or more of: determining whether the gradient of the curve, a line of best fit or an asymptote is within an allowable range; determining whether a pressure value exceeds or falls below a threshold value; and determining whether a pressure value falls outside an allowable range.

The system may be an aircraft system wherein the component actuates a flight control surface of the aircraft.

The method may further comprise: prior to step (A), detecting a fault in the supply of hydraulic fluid to the component during operation, and fluidly disconnecting a first, primary hydraulic supply system from the component; and identifying a second, backup hydraulic supply system and performing steps (A) to (D), wherein the hydraulic supply system referred to in step (A) is the second, backup hydraulic supply system.

The method may further comprise repeatedly carrying out steps (A) to (D) during an inactive state when immediately prior to step (A) none of the hydraulic supply systems are supplying hydraulic fluid to the component.

Step (D) of the method may comprise comparing the monitored pressure over time from step (C) with a pressure-time curve.

Features of the systems, devices, and methods described herein may be used in various combinations, in accordance with the embodiments described herein.

BRIEF DESCRIPTION OF THE DRAWINGS

Various embodiments will now be described, by way of example only, and with reference to the accompanying drawings in which.

DETAILED DESCRIPTION

The present invention relates to a system comprising a hydraulically controlled (e.g., actuated) component, which is controlled using fluid supplied at pressure by multiple hydraulic fluid supply systems. The system may be a safety critical system, and/or may be applied to any situation in which it is necessary to mitigate against a hydraulic failure (e.g., leakage).

Figure 1:
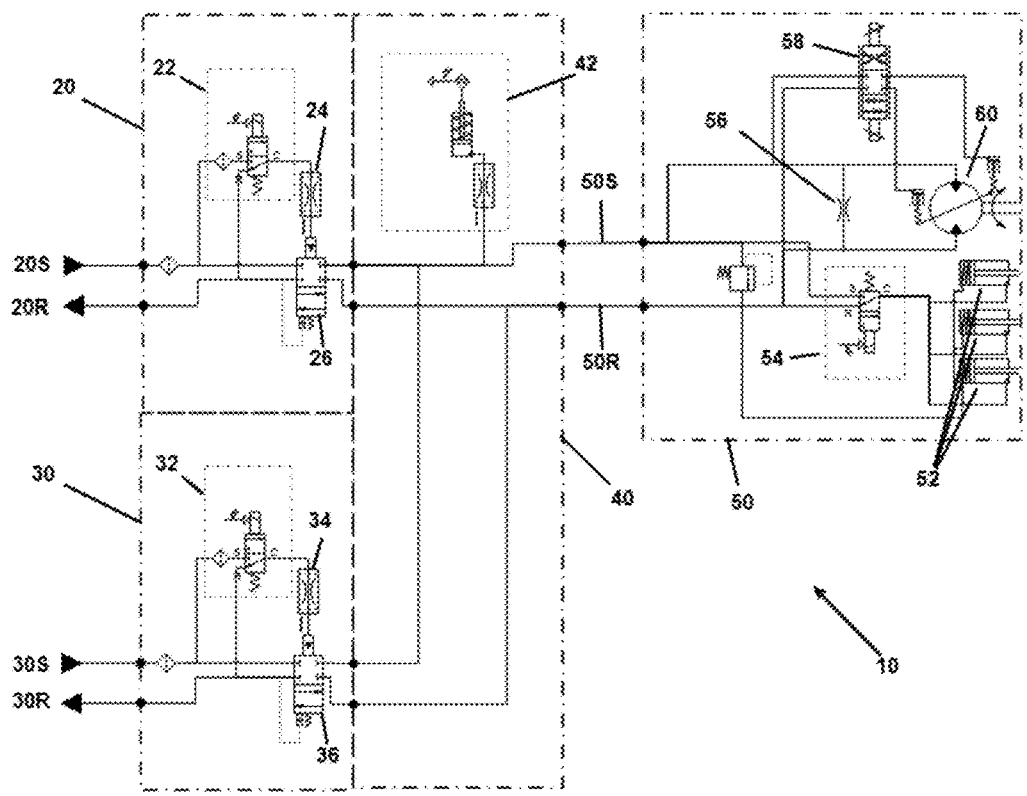
FIG. 1 shows an exemplary system in accordance with an embodiment of this disclosure.

Referring to FIG. 1, the system 10 comprises a hydraulically controlled component 50, which in this illustrative embodiment is a power drive unit ("PDU") that uses the hydraulic fluid to actuate the component 50. The component used in the present invention could be any component that is controlled or actuated using hydraulic fluid, and is not limited to the PDU illustrated.

The hydraulically controlled component 50 comprises a supply side 50S comprising one or more fluid passages that receive pressurised hydraulic fluid from a source thereof (e.g., a supply line) and a return side 50R comprising one or more fluid passages that pass this fluid back to the source (e.g., a return line), once the hydraulic fluid is used to control/actuate the component 50.

The system 10 further comprises multiple hydraulic supply systems 20, 30 (or subsystems) that supply hydraulic fluid to the PDU 50. Two are shown in the illustrated embodiment, but any number could be used as long as there are a plurality. These hydraulic supply systems 20, 30 are hydraulically isolated from each other, in that they comprise separate supply and return lines 20S, 20R, 30S, 30R, and separate pumps, regulators, reservoirs, etc. (not shown).

Each hydraulic supply system 20, 30 comprises a control valve 26, 36 configured to selectively (and fluidly) connect the supply and return lines 20S, 20R, 30S, 30R of the respective hydraulic supply system 20, 30 with the supply and return sides 50S, 50R of the PDU 50.

In FIG. 1, both control valves 26, 36 are in a closed position, meaning the system downstream of the control valves 26, 36 (including the supply and return sides 50S, 50R of the PDU 50) are isolated from both hydraulic supply systems 20, 30.

To enable the first hydraulic supply system 20 to supply hydraulic fluid to the PDU 50, the first control valve 26 can move to an open position to connect the supply and return lines 20S, 20R of the first hydraulic supply system 20 with the supply and return sides 50S, 50R of the PDU 50. The second control valve 36 can stay in the closed position.

Should the first hydraulic supply system 20 fail, the first valve 26 could be moved to its closed position, and the second valve 36 moved to an open position, which would fluidly disconnect the (failed) first hydraulic supply system 20 from the PDU 50, and connect the second hydraulic supply system 30 to the PDU 50. This ensures a supply of hydraulic fluid to the PDU 50.

Each hydraulic supply system 20, 30 may comprise a solenoid valve 22, 32 configured to activate the control valve 26, 36 by acting as an idle valve. In the illustrated embodiment, the output of each solenoid valve 22, 32 is connected to the respective return line 20R, 30R of the hydraulic supply system 20, 30. The output of the solenoid valves 22, 32 are operatively connected to a signal input of the respective control valve 26, 36 via a supply restrictor 24, 34. Each control valve 26, 36 is configured to move from a closed position to an open position subject to pressure being provided to the signal input. The return line 20R, 30R provides insufficient pressure to the signal input for the control valve 26, 36 to open. Upon receiving an electrical signal, the solenoid valve 22, 32 switches such that its output is connected to the respective supply line 20S, 30S. The supply line 20S, 30S provides a higher pressure to the signal input of the respective control valve 26, 36 that is sufficient for the control valve 26, 36 to move to the open position. Thus, the supply and return lines 20S, 20R, 30S, 30R of the respective hydraulic supply system 20, 30 are fluidly connected to the supply and return sides 50S, 50R of the PDU 50.

The system 10 further comprises a device 40, which is configured to monitor the pressure at the supply side 50S of the PDU 50. The device 40 may comprise a pressure indicator 42 that can be operatively connected to the supply side 50S. Whilst the illustrated embodiment of the device 40 monitors the supply side 50S using a pressure indicator 42, it will be appreciated that monitoring the return side 50R using a pressure indicator, or measuring the difference between the supply and return sides 50S, 50R with a differential sensor using similar analysis would also be possible.

The exemplary hydraulically actuated component (PDU) 50 comprises brake pistons 52 and a hydraulic motor 60, and is for use in an aircraft. The pistons 52 are actuated using hydraulic fluid supplied under pressure to different chambers via a brake solenoid 54. In the illustrated embodiment, the output of the brake solenoid 54 is connected to the return side 50R which does not supply enough pressure to activate the brake pistons 52. When activation of the brake pistons 52 is desired, the brake solenoid 54 is configured to switch and connect its output to the supply side 50S, which in turn supplies pressure to the brake pistons 52.

Similarly, the motor 60 is actuated using hydraulic fluid supplied under pressure to rotate the motor 60 in a specific direction via a servo valve 58. In the illustrated embodiment, the servo valve 58 is closed, so no torque is being provided to the motor 60. When rotation of the motor 60 is desired, the servo valve 58 is configured to open and provide pressure to the motor 60 such that it rotates in the desired direction.

Whilst the hydraulically actuated component 50 has been described as a PDU 50, as noted above the present invention is not limited to any specific hydraulically actuated component 50, and any could be used to benefit from the advantages set out herein.

Hydraulically actuated components 50 typically comprise a controlled leakage between the supply and return sides 50S, 50R. This could be using the natural leakage through a motor (e.g., through motor 60 in FIG. 1). Alternatively, or additionally a bleed restrictor 56 could be included in the component 50 to provide the controlled leakage. The controlled leakage (e.g., restrictor 56) is configured to slowly equalise the pressure between the supply and return sides 50S, 50R when the component 50 is isolated from both the hydraulic supply systems 20, 30 (i.e., both the control valves 26, 36 are closed).

The system 10 comprises a controller (not shown) configured to control the various valves and component 50. The controller may be connected to the solenoid valves 22, 32 and configured to communicate with the device 40. The controller carries out a series of instructions and analysis, described in greater detail below, that may provide information for prognostics and health management ("PHM") purposes and/or to perform individual health checks on each hydraulic supply system 20, 30.

Prior to use, the system 10 may be set up as shown in FIG. 1, wherein the control valves 26, 36 are in the closed position, such that the component 50 is fluidly isolated from both hydraulic supply systems 20, 30. In situations where the system 10 does not need to be active during operation, the system 10 may stay in this configuration. If the system 10 is required to be active, it carries out a start-up procedure as follows.

When the system 10 starts up, the first solenoid valve 22 receives an appropriate signal, which may be from the controller or from another source. In the illustrated embodiment this causes the first solenoid valve 22 to switch, such that its output is connected to the first supply line 20S, which in turn causes the first valve 26 to move to its open position (as noted above this particular arrangement is not essential). Thus, the first supply and return lines 20S, 20R are fluidly connected to the supply and return sides 50S, 50R of the component 50, bringing them up to an operational pressure.

The operational pressure provided by the supply line 20S (and supply line 30S if the second hydraulic supply system 30 is connected) to the supply side 50S may be a constant pressure with a value of between 2000 psi (13.8 MPa) and 5000 psi (34.5 MPa), or 3000 psi (20.7 MPa). The operational pressure of the return lines 20R, 30R and the return side 50R of the component may be a constant pressure with a value of between 50 psi (0.34 MPa) and 200 psi (1.38 MPa), or 100 psi (0.69 MPa). The volume of the supply side 50S and the return side 50R may be roughly equal. These values are exemplary and may of course vary depending on the application.

Before the component 50 is used (i.e., prior to operation), the controller may be used to determine the health of one of the hydraulic supply systems 20, 30 (or both sequentially) and the component 50. The first step of this health check is for the controller to transmit a signal to activate the hydraulic supply system 20, 30 being checked. In the illustrated embodiment this means transmitting a signal to switch the solenoid valve 22, 32. The signal switches the solenoid 22, 32 such that the respective control valve 26, 36 moves to an open position, as discussed previously. This brings the system downstream of the valve 26, 36 up to a working pressure, including the supply side 50S of the component 50. This increase to a working pressure can be detected by the device 40.

Once the device 40 detects the increase to working pressure (which could correspond to a threshold pressure), or a predetermined amount of time passes, the controller transmits an appropriate signal to close the respective control valve 26, 36, which isolates the system downstream of the valve 26, 36 from the hydraulic supply 20S, 30S. As this downstream section is now isolated, the controlled leakage (e.g., flow through restrictor 56) will slowly cause the pressure to equalise between the supply and return sides 50S, 50R of the component 50.

Assuming there are no leaks in the downstream system, then the pressure in both sides 50S, 50R, in this example, will reach the same nominal value, for example around 1500 psi (10.3 MPa). This nominal value is dependent on the relative volume and pressures of the supply and return sides 50S, 50R.

The controller is configured to monitor the pressure. If the pressure does not follow a predetermined or expected pattern (e.g., curve, and/or remain within a tolerance), the system 10 will fail the health check. For example, the controller may determine whether the pressure reduces to and rests at the (expected) nominal value. If the pressure does not, and (e.g.) continues to fall, this can indicate a problem with the component 50. There may, for example, be a leak in the supply or return sides 50S, 50R thereof. The controller can indicate this to the operator, who can then decide on the most appropriate course of action. As noted below, the pressure could indicate a problem with the hydraulic supply system 20, 30 as opposed to the component 50 (or both).

Once the health check has been completed for one of the hydraulic supply systems 20, 30, the process may then be repeated for each hydraulic supply system 20, 30 in the system 10 in the same manner. This can provide additional information to the operator.

Figure 2:
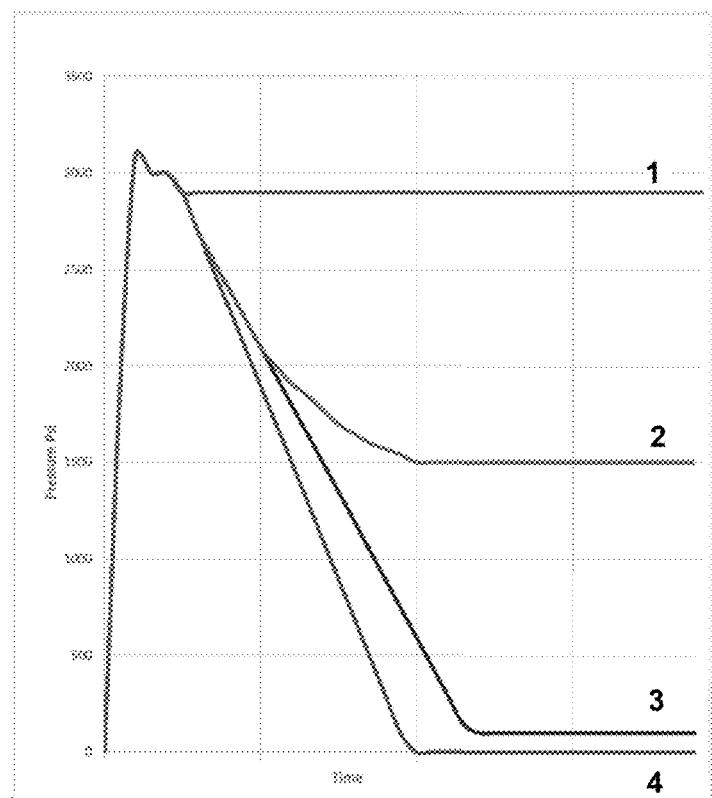
FIG. 2 shows exemplary pressure curves that may indicate the health of the system.

FIG. 2 shows examples of pressure-time curves that may result from the readings of device 40 during a health check. These are not exhaustive and various types of curve could form a predetermined or expected pattern depending on the system at hand. The present invention is not limited to detecting a failure, for example, and could be used to detect a fault (or a type of fault), confirm a healthy system, or gather diagnostic information. Thus, the pressure-time curves could be indicative of any health information and are not limited to the examples illustrated.

Trace 2 shows a pressure curve that would indicate all of the hydraulic subsystems 20, 30, 40 and 50 are working as intended. First, the pressure rapidly increases to the working pressure of around 3000 psi (20.7 MPa) following the opening of the control valve 26, 36. Then, once the control valve 26, 36 is closed, the pressure exponentially decreases to the theoretical equilibrium pressure of around 1500 psi (10.3 MPa). Whilst the pressure may continue to drop slightly, the controller can that may account for internal leakage and minor sealing issues (or not).

Trace 4 shows a pressure curve that is indicative of an unacceptable leak. Again, the pressure initially rapidly increases to the working pressure of around 3000 psi (20.7 MPa). After the closing of the valve 26, 36, the pressure drops off below the theoretical equilibrium pressure at a gradient greater than the allowable range, which corresponds to the fluid leaking from the system 10 at a rate where normal operation of the hydraulics is no longer possible. When determining the allowable range of the pressure gradient, the operating temperature may be taken into account, since the pressure may be reduced as a result of cold temperatures. Of course, other factors may be loaded into the controller depending on the situation at hand.

Traces 1 and 3 show pressure curves that are indicative of a control valve 26, 36 leakage. In Trace 1, after the control valve 26, 36 has been instructed to close, the pressure remains at around 3000 psi (20.7 MPa) which would indicate that one of the control valve 26, 36 is leaking on the supply side. In Trace 3, after the control valve 26, 36 has been instructed to close, the pressure drops to and stabilises at around 100 psi (0.69 MPa) which would indicate that one of the control valves 26, 36 is leaking on the return side.

In situations where the system 10 does not need to be active during operation, the control valves 26, 36 will remain closed following the health check. The isolated downstream section should still retain some pressure, and so the controller may continue to monitor this pressure to periodically assess whether the isolated downstream section of the system 10 is devoid of leaks.

When the system is active the controller can perform a health check to ensure that a backup hydraulic supply system is not activated undesirably. This is a particularly useful application of the technology described herein. For example, the controller may detect a failure of the hydraulics, but this could be caused by a leak within the component 50 rather than a problem with the first hydraulic supply system 30. In this case switching to a backup hydraulic supply system will not help (and will simply drain that system of hydraulic fluid).

Applying this example to the illustrated embodiment, if the system 10 is active then the first control valve 26 may be open so that the first hydraulic supply system 20 supplies pressurised fluid to the supply side 50S of the component 50. The device 40 should read a substantially constant pressure equal to the working pressure of the first supply line 20S.

The controller will monitor the device 40 and look for a substantial pressure drop that may indicate a hydraulic failure. Additionally, or alternatively a failure may be indicated by another source. Once the controller is aware of a failure, it transmits a signal to the first solenoid valve 22 to cause this to switch, such that the first control valve 26 moves to the closed position.

In this failure scenario, the second hydraulic supply system 30 is intended to function as a backup to the first hydraulic supply system 20. However, whilst the controller has identified a hydraulic failure, the cause of the failure may be unknown. If there is a leak in the section of the system 10 downstream of the control valves 26, 36, or if one of the control valves 26, 36 is leaking, then activation of the secondary hydraulic supply system 30 may simply result in both hydraulic supply systems 20, 30 being drained of fluid. Therefore, the present invention may incorporate the use of the aforementioned health check to determine whether the cause of hydraulic failure will also affect the second hydraulic supply system 30.

As such, following the failure of the first hydraulic supply system 20, the controller may be configured to transmit a signal to the second solenoid valve 32 such that the second control valve 36 is moved to its open position. Once the device 40 determines that the pressure has increased to the working pressure, the controller is configured to transmit a signal to the second solenoid valve 32 such that the second control valve 36 is moved back to its closed position. This isolates the section of the system 10 downstream of the second control valve 36. The controller is then configured to monitor the pressure recorded by the device 40 to determine whether the pressure curve is indicative of a failure upstream of the first valve 26 (e.g., Trace 2 of FIG. 2), a failure of the valves 26, 36 (e.g., Traces 1 or 3 of FIG. 2) or a failure downstream of the first valve 26 (e.g. Trace 4 of FIG. 2).

The controller may be configured to determine that the hydraulic failure was due to a problem upstream of the first valve 26 (i.e., a failure that will not affect the second hydraulic supply system 30), in which case the controller is configured to transmit an appropriate signal to open the second control valve 36. The system 10 is then pressurised again using the pressure from the second hydraulic supply 30S to continue operation. If the controller determines that the cause of the hydraulic failure was downstream of the first control valve 26, or due to a failure of the control valves 26, 36 themselves, the controller may be configured to keep the control valves 26, 36 closed, so that the second hydraulic supply system 30 is not activated. This could be until confirmation is received from an external source that the problem has been fixed.

The invention claimed is:

1. A system for controlling a hydraulic component, comprising:
    a hydraulic component comprising a hydraulic supply side and a hydraulic return side, and comprising a controlled leakage between the hydraulic supply side and the hydraulic return side through a bleed restrictor connected between the hydraulic supply side and the hydraulic return side;
    a plurality of hydraulic supply systems, each configured to selectively supply pressurized hydraulic fluid to the component;
    a device configured to monitor a pressure of the pressurized hydraulic fluid within the hydraulic supply side and/or the hydraulic return side; and
    a control system configured to carry out a health check routine on one or more of the hydraulic supply systems, the routine comprising the steps of:
    (A) fluidly connecting one of the hydraulic supply systems with the component until (i) a predetermined pressure is reached on the hydraulic supply side and/or the hydraulic return side, and/or (ii) a predetermined amount of time has passed; and then
    (B) isolating the pressurized hydraulic fluid within the hydraulic supply side and the hydraulic return side so that the pressurized hydraulic fluid leaks from the hydraulic supply side to the hydraulic return side via the bleed restrictor;
    (C) monitoring the pressure over time of the pressurized hydraulic fluid within the hydraulic supply side or the hydraulic return side over time; and then
    (D) determining if the pressure over time of the pressurized hydraulic fluid within the hydraulic supply side or the hydraulic return side follows a predetermined or expected pattern,
    wherein the control system is configured to perform the health check routine when switching between a first of the hydraulic supply systems and a second, backup of the hydraulic supply systems.

2. The hydraulic system of claim 1, wherein the isolating comprises forming a closed hydraulic system comprising the hydraulic supply side and the hydraulic return side, such that the pressure of the pressurized hydraulic fluid equalizes over time between the supply and return sides by virtue of the bleed restrictor.

3. The hydraulic system of claim 2, wherein the isolating comprises fluidly disconnecting the one of the hydraulic supply systems referred to in step (A) from the component.

4. The hydraulic system of claim 1, wherein each of the hydraulic supply systems are configured to selectively fluidly connect a hydraulic supply line to the hydraulic supply side and a hydraulic return line to the hydraulic return side.

5. The hydraulic system of claim 1, wherein the control system is configured to control which of the hydraulic supply systems are fluidly connected to the component using one or more valves.

6. The hydraulic system of claim 5, wherein each of the one or more valves is controlled by a solenoid valve.

7. The hydraulic system of claim 1, wherein the predetermined or expected pattern corresponds to a predetermined or expected pressure equalization.

8. The hydraulic system of claim 1, wherein the control system is configured to perform the health check routine when the system is in an inactive state and none of the hydraulic supply systems are supplying the pressurized hydraulic fluid to the component.

9. The hydraulic system of claim 8, wherein the health check routine is carried out repeatedly over time.

10. The hydraulic system of claim 1, wherein step (D) comprises comparing the monitored pressure over time from step (C) with a pressure-time curve, and one or more of:
    determining whether a gradient, a line of best fit or an asymptote of the monitored pressure over time is within an allowable range;
    determining whether the pressure exceeds or falls below a threshold value; and
    determining whether the pressure falls outside an allowable range.

11. The hydraulic system of claim 1, wherein the system is an aircraft system and the component actuates a flight control surface of the aircraft system.

12. The hydraulic system of claim 1, wherein the control system is configured to perform the health check routine every time that the hydraulic system switches between the first of the hydraulic supply systems and the second, backup hydraulic supply system.

13. A method of operating a hydraulic component, wherein the hydraulic component comprises a hydraulic supply side and a hydraulic return side, and a controlled leakage is provided between the hydraulic supply side and the hydraulic return side through a bleed restrictor connected between the hydraulic supply side and the hydraulic return side, the method comprising:
    providing a plurality of hydraulic supply systems, each configured to selectively supply pressurized hydraulic fluid to the component,
    and the steps of:
    (A) fluidly connecting one of the hydraulic supply systems with the component until (i) a predetermined pressure is reached on the hydraulic supply side and/or the hydraulic return side, and/or (ii) a predetermined amount of time has passed; and then
    (B) isolating the pressurized hydraulic fluid within the hydraulic supply side and the hydraulic return side so that the pressurized hydraulic fluid leaks from the hydraulic supply side to the hydraulic return side via the bleed restrictor;
    (C) monitoring a pressure over time of the pressurized hydraulic fluid within the hydraulic supply side and/or the hydraulic return side; and then
    (D) determining if the pressure over time of the pressurized hydraulic fluid within the hydraulic supply side and/or the hydraulic return side follows a predetermined or expected pattern,
    prior to step (A), detecting a fault in the supply of the pressurized hydraulic fluid to the component during operation, and fluidly disconnecting a first, primary hydraulic supply system of the plurality of hydraulic supply systems from the component; and
    identifying a second, backup hydraulic supply system of the plurality of hydraulic supply systems and, before fluidly connecting the second, backup hydraulic supply system, performing steps (A) to (D), wherein the one of the hydraulic supply system referred to in step (A) is the second, backup hydraulic supply system.

14. The method of claim 13, further comprising:
    repeatedly carrying out steps (A) to (D) during an inactive state when immediately prior to step (A) none of the hydraulic supply systems are supplying the pressurized hydraulic fluid to the component.

15. The method of claim 13, wherein step (D) comprises comparing the monitored pressure over time from step (C) with a pressure-time curve.

16. The method of claim 13, wherein steps (A) to (D) are carried out every time that the hydraulic system switches between the first of the hydraulic supply systems and the second, backup hydraulic supply system.

17. A system for controlling a hydraulic component, comprising:
    a hydraulic component comprising a hydraulic supply side and a hydraulic return side, and comprising a controlled leakage between the hydraulic supply side and the hydraulic return side, wherein the controlled leakage comprises a bleed restrictor;
    a plurality of hydraulic supply systems, each configured to selectively supply pressurized hydraulic fluid to the component;
    a device configured to monitor a pressure of the pressurized hydraulic fluid within the hydraulic supply side and/or the hydraulic return side; and
    a control system configured to control which of the hydraulic supply systems are fluidly connected to the component using one or more valves,
    wherein the control system is configured to carry out a health check routine on one or more of the hydraulic supply systems, the routine comprising the steps of:
    (A) fluidly connecting one of the hydraulic supply systems with the component until (i) a predetermined pressure is reached on the hydraulic supply side and/or the hydraulic return side, and/or (ii) a predetermined amount of time has passed; and then
    (B) isolating the pressurized hydraulic fluid within the hydraulic supply side and the hydraulic return side so that the pressurized hydraulic fluid leaks from the hydraulic supply side to the hydraulic return side via the bleed restrictor;
    (C) monitoring the pressure over time of the pressurized hydraulic fluid within the hydraulic supply side or the hydraulic return side; and then (D) determining the pressure over time of the pressurized hydraulic fluid within the hydraulic supply side or the hydraulic return side follows a predetermined or expected pattern, wherein, following step (D), the control system is configured to carry out the steps of:

determining whether a hydraulic failure has occurred; and if the hydraulic failure is detected, determining whether the hydraulic failure was caused by a failure of the one or more valves.

18. The system of claim 17, wherein, if the hydraulic failure is detected, the control system is further configured to determine whether the hydraulic failure was caused by:

a problem upstream of the one or more valves; or a problem downstream of the one or more valves.

19. The hydraulic system of claim 17, wherein the step of determining whether the hydraulic failure was caused by the failure of the one or more valves comprises evaluating the monitored pressure over time of step (C).

20. The hydraulic system of claim 17, wherein each of the one or more valves is controlled by a solenoid valve.

21. A method of operating a hydraulic component, wherein the hydraulic component comprises a hydraulic supply side and a hydraulic return side, and a controlled leakage is provided between the hydraulic supply side and the hydraulic return side, wherein the controlled leakage comprises a bleed restrictor, the method comprising:

providing a plurality of hydraulic supply systems, each configured to selectively supply pressurized hydraulic fluid to the component;

controlling which of the hydraulic supply systems are fluidly connected to the component using one or more valves;

and the steps of:

(A) fluidly connecting one of the hydraulic supply systems with the component until (i) a predetermined pressure is reached on the hydraulic supply side and/or the hydraulic return side, and/or (ii) a predetermined amount of time has passed; and then (B) isolating the pressurized hydraulic fluid within the hydraulic supply side and the hydraulic return side so that the pressurized hydraulic fluid leaks from the hydraulic supply side to the hydraulic return side via the bleed restrictor;

(C) monitoring a pressure over time of the pressurized hydraulic fluid within the hydraulic supply side and/or the hydraulic return side; and then (D) determining if the pressure over time of the pressurized hydraulic fluid within the hydraulic supply side and/or the hydraulic return side follows a predetermined or expected pattern, the method further comprising:

following step (D), determining whether a hydraulic failure has occurred; and if the hydraulic failure is detected, determining whether the hydraulic failure was caused by a failure of the one or more valves.

22. The method of claim 21, wherein, if the hydraulic failure is detected, the method further comprises determining whether the hydraulic failure was caused by:

a problem upstream of the one or more valves; or a problem downstream of the one or more valves.

23. The method of claim 21, wherein the step of determining whether the hydraulic failure was caused by the failure of the one or more valves comprises evaluating the monitored pressure over time of step (C).

* * * * *